(12) United States Patent
     Telborn (10) Patent No.: US 9,481,353 B2
(45) Date of Patent: Nov. 1, 2016

(54) METHOD TO REDUCE FUEL CONSUMPTION WHEN DRIVING A VEHICLE AND SWITCHING TO HIGHER GEAR, A COMPUTER PROGRAM FOR THE METHOD, A SYSTEM ENABLING THE METHOD AND A VEHICLE FOR IT

(71) Applicant: Scania CV AB, Södertälje (SE)

(72) Inventor: Klas Telborn, Södertälje (SE)

(73) Assignee: SCANIA CV AB (SE)

( * ) Notice: Subject to any disclaimer, the term of this patent is extended or adjusted under 35 U.S.C. 154(b) by 42 days.

(21) Appl. No.: 14/410,145

(22) PCT Filed: Jul. 4, 2013

(86) PCT No.: PCT/SE2013/050867
§ 371 (c)(1),
(2) Date: Dec. 22, 2014

(87) PCT Pub. No.: WO2014/011105
PCT Pub. Date: Jan. 16, 2014

(65) Prior Publication Data
US 2015/0321673 A1    Nov. 12, 2015

(30) Foreign Application Priority Data
Jul. 5, 2012 (SE) ...................... 1250775

(51) Int. Cl.
*F16H 47/10*     (2006.01)
*B60W 10/06*     (2006.01)
(Continued)

(52) U.S. Cl.
CPC .............. *B60W 10/06* (2013.01); *B60W 10/11* (2013.01); *B60W 30/188* (2013.01);
(Continued)

(58) Field of Classification Search
CPC .. B60W 10/06; B60W 10/11; B60W 30/188; B60W 2520/10; B60W 2710/0622; B60W 2510/0638; B60W 2510/1005; F16H 61/0213; F16H 61/00; F16H 2061/0227; F16H 59/14; F02D 29/02; F02D 41/023; F02D 41/2422; F02D 11/105; F02D 23/02; F02D 41/04; F02D 2250/18; F02D 2200/606
See application file for complete search history.

(56) References Cited

U.S. PATENT DOCUMENTS 4,589,396 A    5/1986    Tokushima et al. .......... 123/559
(Continued)

FOREIGN PATENT DOCUMENTS

| DE | 10 2006 054 602 A1 | 5/2008 |
| WO | WO 00/50254 A1 | 8/2000 |
| WO | WO 2011/075068 A1 | 6/2011 |

OTHER PUBLICATIONS

International Search Report mailed Oct. 31, 2013 in corresponding PCT International Application No. PCT/SE2013/050867.

*Primary Examiner* — David J Hlavka
(74) *Attorney, Agent, or Firm* — Ostrolenk Faber LLP (57) ABSTRACT

A method to reduce fuel consumption when driving a vehicle, wherein the vehicle comprises an internal combustion engine, and a gearbox that is settable to a plurality of transmission ratios, and the vehicle is configured to be driven in at least a first mode ($M_1$) and a second mode ($M_2$), wherein, when the vehicle is driven according to the second mode ($M_2$), a reduced fuel consumption is prioritized to a larger extent at the cost of performance compared with when the vehicle is driven according to the first mode ($M_1$). When setting the gearbox from a first transmission ratio to a second transmission ratio lower than the first transmission ratio that is one of the three lowest settable transmission ratios for the gearbox, the method includes comparing a torque ($T_{req}$) requested from the internal combustion engine after setting the gearbox to the second transmission ratio with a first torque ($T_{lim1}$), and driving the vehicle according to the second mode ($M_2$) if the request for torque ($T_{req}$) from the internal combustion engine is below the first torque ($T_{lim1}$).

23 Claims, 4 Drawing Sheets

(51) Int. Cl.
*B60W 10/11* (2012.01)
*B60W 30/188* (2012.01)
*F02D 41/04* (2006.01)
*F16H 61/00* (2006.01)
*F02D 23/02* (2006.01)
*F02D 41/02* (2006.01)
*F02D 41/24* (2006.01)
*F02D 11/10* (2006.01)
*F02D 29/02* (2006.01)
*F16H 61/02* (2006.01)
*F16H 59/14* (2006.01)

(52) U.S. Cl.
CPC ............ *F02D 11/105* (2013.01); *F02D 23/02* (2013.01); *F02D 29/02* (2013.01); *F02D 41/023* (2013.01); *F02D 41/04* (2013.01); *F02D 41/2422* (2013.01); *F16H 61/00* (2013.01); *F16H 61/0213* (2013.01); *B60W 2510/0638* (2013.01); *B60W 2510/1005* (2013.01); *B60W 2520/10* (2013.01); *B60W 2710/0622* (2013.01); *F02D 2200/606* (2013.01); *F02D 2250/18* (2013.01); *F16H 59/14* (2013.01); *F16H 2061/0227* (2013.01); *Y02T 10/144* (2013.01); *Y10T 477/55* (2015.01); *Y10T 477/675* (2015.01)

(56) References Cited

U.S. PATENT DOCUMENTS

| | | | | |
|---|---|---|---|---|
| 4,853,720 A | * | 8/1989 | Onari | B60K 31/0008 123/350 |
| 4,996,965 A | * | 3/1991 | Onari | F02D 41/04 123/492 |
| 5,573,476 A | * | 11/1996 | Minowa | B60W 10/06 477/109 |
| 5,643,133 A | | 7/1997 | Minowa et al. | 477/107 |
| 5,754,968 A | | 5/1998 | Hedström | 701/66 |
| 2006/0167610 A1 | * | 7/2006 | Reinards | F16H 61/0213 701/56 |
| 2007/0213176 A1 | | 9/2007 | Fujii et al. | 477/107 |
| 2008/0162008 A1 | * | 7/2008 | Kojima | F16H 61/0213 701/55 |
| 2008/0234104 A1 | | 9/2008 | Berglund et al. | 477/123 |
| 2010/0152983 A1 | | 6/2010 | Crowell | 701/54 |
| 2010/0318268 A1 | | 12/2010 | Jager et al. | 701/54 |
| 2011/0320095 A1 | * | 12/2011 | Anderson | B60W 10/06 701/54 |
| 2012/0059561 A1 | * | 3/2012 | Niwa | B60W 10/06 701/54 |
| 2012/0083980 A1 | * | 4/2012 | Kresse | F16H 61/0213 701/56 |
| 2012/0136506 A1 | * | 5/2012 | Takeuchi | B60G 17/016 701/1 |
| 2013/0297185 A1 | * | 11/2013 | Morris | F02D 11/105 701/104 |
| 2015/0167624 A1 | * | 6/2015 | Martin | F02D 37/02 123/406.11 |
| 2015/0198247 A1 | * | 7/2015 | Yahagi | B60K 31/0058 701/52 |
| 2015/0233470 A1 | * | 8/2015 | Seay | F16H 61/0213 701/55 |

* cited by examiner

METHOD TO REDUCE FUEL CONSUMPTION WHEN DRIVING A VEHICLE AND SWITCHING TO HIGHER GEAR, A COMPUTER PROGRAM FOR THE METHOD, A SYSTEM ENABLING THE METHOD AND A VEHICLE FOR IT

CROSS REFERENCE TO RELATED APPLICATIONS

The present application is a 35 U.S.C. §§371 national phase conversion of PCT/SE2013/050867, filed Jul. 4, 2013, which claims priority of Swedish Application No. 1250775-2, filed Jul. 5, 2012. The contents of both applications are incorporated by reference herein. The PCT International Application was published in the English language.

FIELD OF THE INVENTION

The present invention relates to a method and a system to reduce fuel consumption when driving a vehicle. The invention relates especially to a method and a system when driving a vehicle in which air supply to a combustion chamber of an internal combustion engine can be actively influenced. The present invention also relates to a vehicle, and to a computer program and a computer program product, which implement the method according to the invention.

BACKGROUND OF THE INVENTION

For driving heavy vehicles, such as trucks, buses and the like, vehicle economy has over time had an ever increasing impact on the profitability of the enterprise in which the vehicle is used. In addition to the cost of procurement of the vehicle, it is generally the case that the main items of expenditure for the running of a vehicle are the pay given to the driver of the vehicle, costs of repairs and maintenance, and fuel for propulsion of the vehicle.

Depending on the type of vehicle, different factors can have different levels of impact, but the fuel consumption is generally a substantial item of expenditure, and, since the degree of utilization of heavy vehicles is often high, associated with considerable total fuel consumption, the fuel costs can have a very great impact on profitability for an owner of the vehicle, for example a haulage company or the like.

Therefore, every possibility of reducing the fuel consumption can have a positive effect on profitability, and, especially in long-distance driving, it is especially important to optimize the fuel consumption. For example, for this purpose, long-distance vehicles are produced which are characterized by a typical cruising speed for the internal combustion engine, where the cruising speed is adapted for a certain operating speed. Typical operating speeds, depending on the region and/or type of road, can be, for example, 80 km/h, 85 km/h or 89 km/h.

In addition to fuel economy, it is becoming more and more important, in heavy vehicles, that the driver of the vehicle finds the driving experience comfortable and intuitive. For example, the use of automatically changing transmissions, where the change of gear is controlled completely or partially by the control system usually present in the vehicle, can make driving the vehicle easier.

Automatic gear change also permits further freedom in controlling the progress of the vehicle from the perspective of fuel economy, for example by using the control system of the vehicle to ensure that the vehicle is driven in a gear that is advantageous from the point of view of fuel economy.

However, good comfort for the driver also entails other aspects, for example ensuring good driveability, i.e. that the vehicle from a performance point of view, e.g. torque demand, responds in a manner expected by the driver, and also without undesired delay.

SUMMARY OF THE INVENTION

It is an object of the present invention to provide a method that can further reduce the fuel consumption of vehicles driven by an internal combustion engine, and that permits good driveability when operating the vehicle.

The present invention relates to a method to reduce fuel consumption when driving a vehicle that comprises an internal combustion engine and is configured to be driven in at least a first mode and a second mode, wherein, when the vehicle is driven according to the second mode, a reduced fuel consumption is prioritized to a larger extent at the cost of performance compared with when the vehicle is driven according to the first mode, and said vehicle comprises a gearbox that is settable to a plurality of transmission ratios.

When setting the gearbox from a first transmission ratio to a second transmission ratio that is lower than the first transmission ratio and is one of the three lowest settable transmission ratios for the gearbox, the method includes:
  comparing a torque requested from the internal combustion engine after setting the gearbox to the second transmission ratio with a first torque, and
  driving the vehicle according to the second mode if the request for torque from the internal combustion engine is below the first torque.

As has been mentioned above, it is desirable that a vehicle can be driven in a way that is as fuel-efficient as possible. As long as the vehicle is being driven at constant speed along a horizontal road, the fuel efficiency of the vehicle among other things is controlled by how close to optimal efficiency the internal combustion engine is working.

At the same time, it is often important that the vehicle has good driveability and, for example, upon torque demand from the driver of the vehicle, the vehicle is able to quickly respond with an expected increase in the transmitted torque.

Modern engines, for example, modern diesel engines, are dependent on a compression of the combustion air supplied for combustion in order to provide a high torque/high power. To ensure that good driveability can be achieved, it is in many situations desirable to have a control in which the pressure of the air supplied for combustion is maintained at a pressure higher than what is actually required from the point of view of combustion. With the aid of the higher pressure, an air margin is obtained, which means that a certain increase in an amount of fuel supplied can be effected without the air/fuel ratio in the combustion dropping to too low a value, wherein the power of the internal combustion engine can be made available more quickly. The air margin thus improves vehicle performance, and therefore driveability, from a driver perspective.

However, a disadvantage of applying an air margin of this kind is that the vehicle will often be driven with an unnecessarily high combustion air pressure, with associated and unnecessary losses on account of greater gas exchange work.

According to the present invention, losses caused by gas exchange work of this kind, for example, are reduced by a method in which, when it is considered that the probability of a large torque demand occurring is small, the vehicle is driven according to a second mode in which fuel consumption is to a large extent prioritized at the cost of performance compared with a first mode for driving the vehicle that is usually applied, and in which first mode performance is prioritized to a greater degree.

According to a first embodiment of the present invention, the second mode, or "economy mode", is applied when an upshift has taken place to one of the three lowest settable transmission ratios for the gearbox, i.e. one of the three highest gears. However, the second mode is applied only if a request for torque from the internal combustion engine, after setting the gearbox to the second transmission ratio, is below a first torque.

Whether the request for torque from the internal combustion engine is below the first torque, after setting the gearbox to the second transmission ratio, can be arranged to be determined before a gear change actually takes place, e.g. by estimating/predicting, before changing gear, an expected torque request after gear change.

When the abovementioned conditions concerning upshift and request for torque are satisfied, it can be assumed that variations in the driving power demand of the vehicle, and therefore expected changes of the torque requested from the internal combustion engine, will be so slow that the combustion air pressure, on demand, will be able to be built up with the necessary speed, e.g. without using an air margin in accordance with the above, wherein various functions that are normally activated in order to maintain good performance, and therefore driveability, can be reduced or completely shut off in the second mode, and wherein the measures are therefore taken in situations where it is less likely that the driver will be affected by poorer driveability.

Thus, for example, the above-mentioned combustion air pressure margin can be reduced or completely eliminated when driving according to the second mode.

According to another example, functions that maintain a combustion air pressure are shut off for a period of time after a reduction of the requested torque, in order to be ready if a high torque demand were to arise within a short period of time.

According to one embodiment, the second mode is applied only if the speed of the vehicle exceeds some suitable speed such as, for example, an arbitrary suitable speed in the range of 70-90 km/h or another suitable speed. The speed of the vehicle reaching the suitable speed, is an indication that expected changes of the torque requested from the internal combustion engine will be slow.

Further features of the present invention and advantages thereof will become clear from the following detailed description of illustrative embodiments and from the attached drawings.

DETAILED DESCRIPTION OF EMBODIMENTS

In the present description and in the attached claims, the term "gearbox" refers to a mechanism which as a whole permits setting of the different transmission ratios that are available when driving the vehicle, where the gearbox itself can comprise several separately controlled gearbox parts, e.g. a main gearbox and, e.g., a range gearbox and/or splitter gearbox, and where the one, two or three lowest transmission ratios referred to below therefore consist of the one, two or three lowest settable transmission ratios (the one, two or three highest gears) to which, for example, a range gearbox or range-splitter gearbox can be set.

Figure 1A:
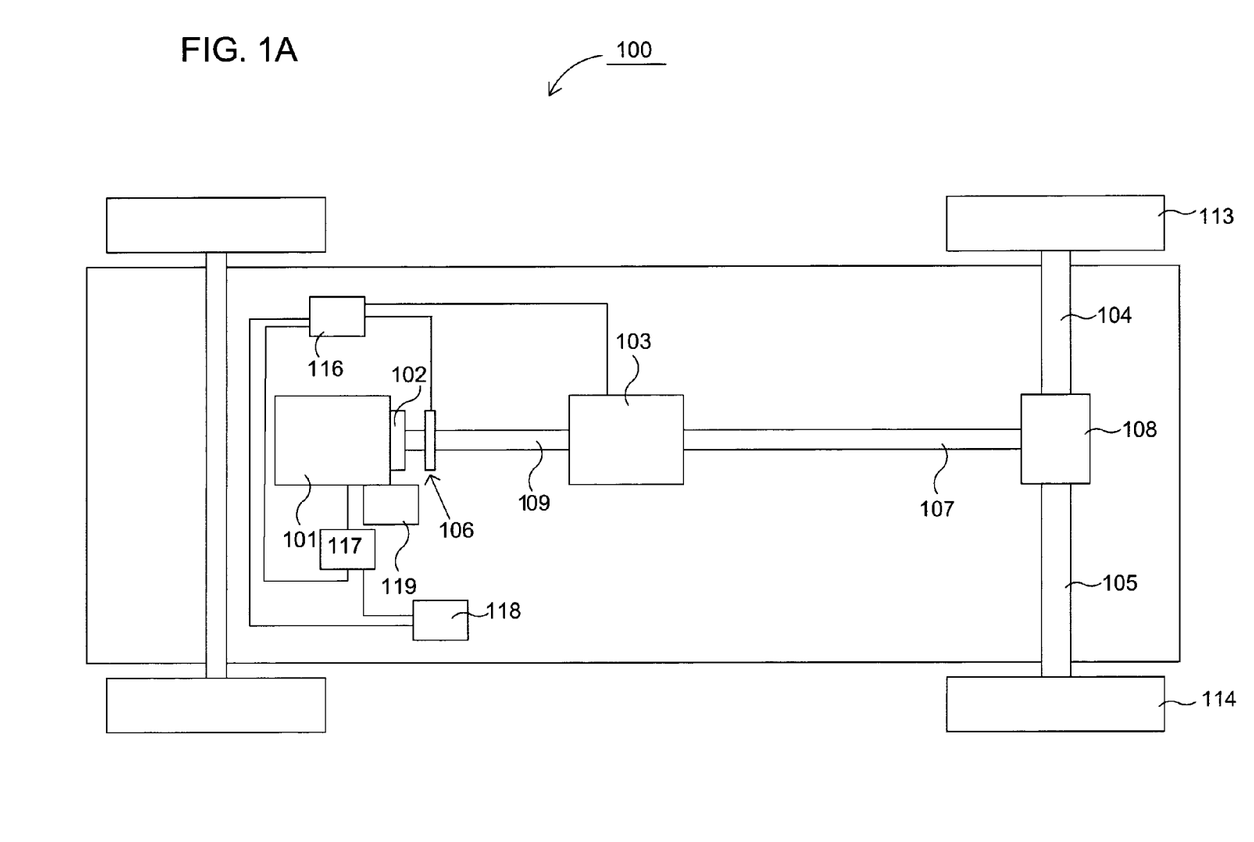
FIG. 1A shows a drive train in a vehicle in which the present invention can be used.

FIG. 1A shows schematically a drive train in a vehicle 100 according to one embodiment of the present invention. The vehicle 100 shown schematically in FIG. 1A comprises only one axle 104, 105 with driving wheels 113, 114, but the invention is also applicable to vehicles where more than one axle is provided with driving wheels, and also to vehicles with one or more additional axles, for example, one or more support axles. The drive train comprises an internal combustion engine 101, which in a conventional way, via an output shaft on the internal combustion engine 101, usually via a flywheel 102, is connected to a gearbox 103 via a clutch 106. The clutch 106 can be a manually or automatically controlled clutch in a known manner, and the gearbox 103 can be arranged to be changed by the driver of the vehicle 100 or automatically by the control system of the vehicle. According to an alternative embodiment, the vehicle 100 is provided with a clutch-free drive train.

A shaft 107 leading from the gearbox 103 then drives the driving wheels 113, 114 via a final gear 108, for example, a conventional differential, and drive shafts 104, 105 connected to said final gear 108.

The present invention relates to internal combustion engines, especially diesel engines, where the amount of air supplied to a combustion chamber, for example a cylinder, can be actively regulated.

In a diesel engine without the possibility of actively regulating the air supplied for combustion, the combustion air available in the combustion will consist of the air which is sucked in during downward movement of the piston, where this intake air consists of air that is sucked in from the surroundings of the vehicle. The amount of air in the combustion is thus substantially the same for each combustion cycle (where variations may however arise, e.g. because of external factors such as prevailing air pressure, temperature, etc.).

This means that only a certain amount of fuel can be injected before the air/fuel ratio (AFR) of the combustion becomes undesirably low. The relationship between a stoichiometric ratio $AFR_{stoich}$ and the actual ratio between air and fuel supplied for combustion (the quotient between the mass of air (kg) and gasoline (kg) supplied for the combustion) is generally called the lambda value, $\lambda$, where the lambda value is defined as $$\lambda = \frac{AFR}{AFR_{stoich}}.$$

As is known, and as is clear from the equation, a lambda value=1 signifies a fuel/air ratio where stoichiometric combustion is obtained, i.e. $AFR=AFR_{stoich}$, and where higher or lower lambda values signify excess air or undersupply of air in the combustion. As is known, however, there are methods for increasing the power of diesel engines, for example, by compressing the air supplied for the combustion in order to supply a greater air mass for the combustion. The greater air mass means that a correspondingly larger amount of fuel can be supplied while maintaining the air/fuel ratio, with higher power development as a result.

As is known, the compression of the supplied air can be achieved in different ways. For example, the compression can be achieved with the aid of a turbo unit 119, such as a VGT (variable geometry turbocharger) unit, or a turbo unit with a waste gate.

With the aid of turbo units of these types, or other suitable turbo units, it is thus possible to compress the air supplied for the combustion, wherein the lambda value λ can thus also be regulated since different amounts of air can be supplied for any given amount of fuel supplied.

However, an increase in the lambda value λ for a given operating point generally also requires a certain increase in the amount of fuel supplied. This is because supply of a greater amount of air results in greater gas exchange work, with the losses associated therewith, which can mean that an increase in the amount of fuel supplied is required in order to overcome losses caused by increased gas exchange work, such that a desired flywheel torque can continue to be maintained.

As has been mentioned above, it is often necessary that a certain compression is maintained such that, from a driver's perspective, the vehicle exhibits good driveability. The present invention relates to a method for reducing the negative effect of losses in gas exchange work in situations where this can be done with no or only little effect on how the driving of the vehicle is experienced by the driver, while at the same time good driveability is still retained in situations where performance is more likely to be utilized.

Figure 1B:
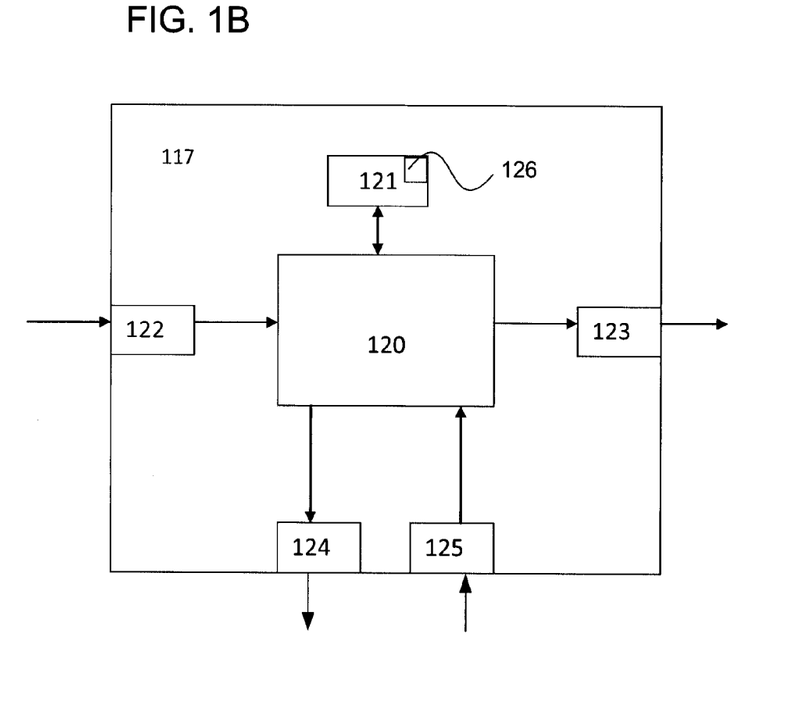
FIG. 1B shows an example of a control unit in a vehicle control system.
Figure 2:
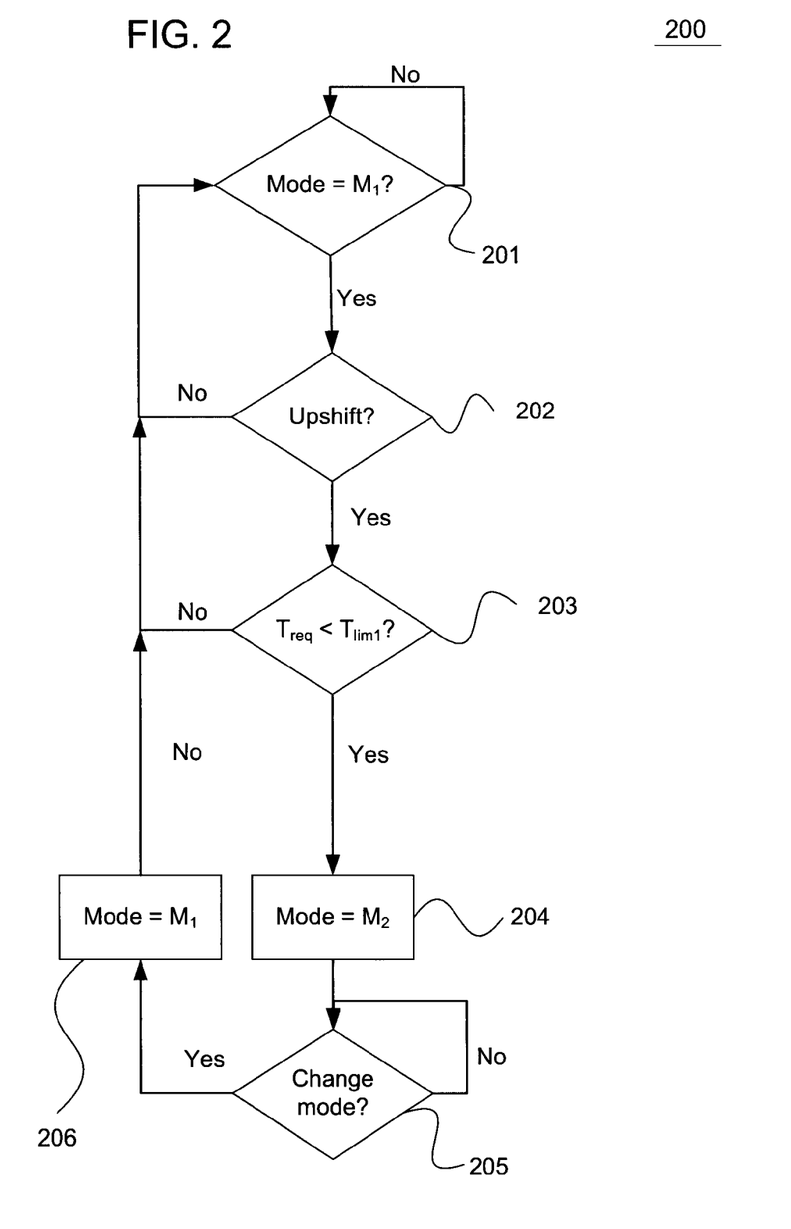
FIG. 2 shows an example of the method according to the present invention.

An exemplary method 200 according to the present invention is shown in FIG. 2. The invention can be implemented in any suitable control unit, for example the control unit 117 shown in FIG. 1B.

Generally speaking, control systems in modern vehicles usually consist of a communications bus system consisting of one or more communications buses for interconnecting a number of electronic control units (ECU), or controllers, and various components arranged on the vehicle. Such a control system can comprise a large number of control units, and the responsibility for a specific function can be divided amongst more than one control unit.

For simplicity, FIG. 1A shows only the control units 116, 117, 118, but vehicles 100 of the disclosed kind often comprise considerably more control units, which is well known to a person skilled in the art.

In the present example, the clutch is an automatically controlled clutch, wherein the control unit 116 controls the clutch 106 via a clutch actuator (not shown), and also the gearbox 103. The control unit 118 is responsible for one or more cruise control functions. These cruise control functions can be of different types, and, according to one embodiment the cruise control function is of a conventional type. According to one embodiment, the cruise control function consists of a cruise control that uses what is called a Look Ahead function. A Look Ahead cruise control (LACC) is a cruise control that uses knowledge of the road section ahead, that is to say knowledge of the road topology, curvature, properties, etc., ahead of the vehicle, in order to adapt the speed of the vehicle according to variations of the road along which the vehicle is being driven. According to one embodiment of the present invention, data of this kind is used to determine whether performance is to be reduced in favor of improved fuel economy.

The control unit 117, in which the present invention in the embodiment shown is implemented, controls the engine 101 of the vehicle 100. The invention can alternatively be implemented in a control unit dedicated to the present invention or entirely or partially in one or more other control units already present on the vehicle 100.

The control of mode for driving a vehicle according to the present invention by the control unit 117 (or the one or more control units on which the present invention is implemented) will probably depend on signals which are received from other control units (also not shown) arranged on the vehicle, and/or information from, for example, various detectors/sensors arranged on the vehicle. It is generally the case that control units of the type shown are normally arranged to receive sensor signals from different parts of the vehicle 100.

Control units of the type shown are also usually arranged to output control signals to different vehicle parts and vehicle components.

The control is often controlled by programmed instructions. These programmed instructions typically consist of a computer program which, when it is executed in a computer or control unit, causes the computer/control unit to perform the desired control, such as method steps according to the present invention. The computer program is usually part of a computer program product, where the computer program product comprises a suitable non-transitory storage medium 121 (see FIG. 1B) with the computer program 126 stored on said storage medium 121. The digital storage medium 121 can be, for example, one from the following group: ROM (Read-Only Memory), PROM (Programmable Read-Only Memory), EPROM (Erasable PROM), Flash memory, EEPROM (Electrically Erasable PROM), a hard-disk unit, etc., and can be arranged in or connected to the control unit, wherein the computer program is executed by the control unit. By changing the instructions of the computer program, it is thus possible to adapt the performance of the vehicle in a specific situation.

An example of a control unit (the control unit 117) is shown schematically in FIG. 1B. The control unit can comprise a computing unit 120, which can be in the form, for example, of any suitable type of processor or microcomputer, for example a circuit for digital signal processing (Digital Signal Processor, DSP), or a circuit having a predetermined specific function (Application Specific Integrated Circuit, ASIC). The computing unit 120 is connected to a memory unit 121, which provides the computing unit 120 with, for example, the stored program code 126 and/or the stored data that the computing unit 120 requires in order to be able to perform computations. The computing unit 120 is also arranged to store partial or final results of computations in the memory unit 121.

In addition, the control unit 117 is provided with devices 122, 123, 124, 125 for receiving and transmitting input and output signals. These input and output signals can contain waveforms, impulses, or other attributes which, by the devices 122, 125 for the reception of input signals, can be detected as information for processing by the computing unit 120. The devices 123, 124 for the transmission of output signals are arranged to convert computation results from the computing unit 120 to output signals for transmission to other parts of the control system of the vehicle and/or the one or more components for which the signals are intended. Each of the connections to the devices for receiving and transmitting input and output signals can be in the form of one or more of a cable; a data bus, such as a CAN bus (Controller Area Network bus), a MOST bus (Media Oriented Systems Transport bus), or some other bus configuration; or by a wireless connection.

Returning to the method 200 shown in FIG. 2, the method begins at step 201, where it is determined whether the vehicle 100 is at present being driven in a mode which is equal to a first mode $M_1$. The first mode $M_1$ is a mode for driving the vehicle 100 where the ability of the vehicle 100 to transmit the requested torque on demand with no or only little delay is given higher priority than in a mode where the vehicle 100 is driven in a manner which instead results in a lower fuel consumption at the cost of performance, for example, in the form of the time it takes to build up a combustion air pressure which results in the desired torque being able to be transmitted from the internal combustion engine.

From a driver perspective, the vehicle in the first mode $M_1$ is felt to be more responsive, i.e., when there is a sudden request for a higher torque, for example, the vehicle will be able relatively quickly to provide a requested torque. In the first mode $M_1$, the vehicle 100 can, for example, be driven with higher pressurization of the air supplied for combustion, without this actually being needed for propulsion of the vehicle, i.e. the required driving power would also be able to be transmitted at a lower pressurization of the air supplied for combustion. The higher pressurization is therefore merely a state of preparedness for a possible increase in the torque request in order to avoid/reduce the otherwise inevitable delay, which can be 2-4 seconds for example, before the air supplied for combustion has reached such a pressure that full power can be developed by the internal combustion engine and the driver's request thereby can be met in full.

Figure 3:
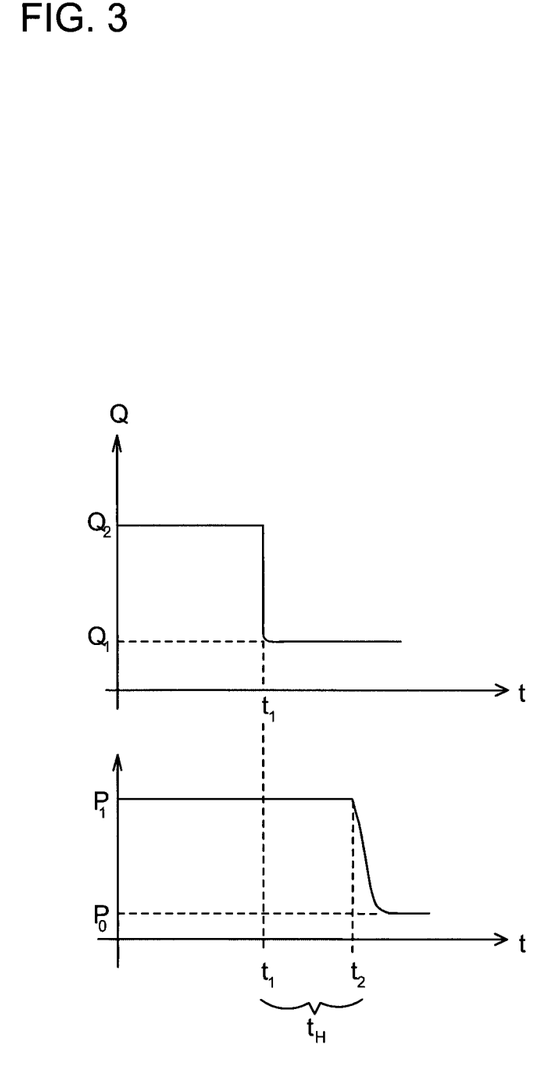
FIG. 3 shows an example of driving a vehicle with maintenance of a combustion air pressure.

This first mode $M_1$ can thus, for example, involve certain functions for improving the driveability of the vehicle 100, for example, from a driver perspective, being activated. An example of such a function is illustrated in FIG. 3. FIG. 3 shows how the fuel supply Q varies over time as the vehicle 100 is driven along a road section (not shown). At the time $t_0$, the vehicle 100 is driven with a high transmitted torque from the internal combustion engine 101, and therefore with a relatively high fuel supply Q amounting to a level $Q_2$, and at the time $t_1$ the requested torque is reduced, wherein the transmitted torque and thus the fuel supply to the internal combustion engine 101 drop from the level $Q_2$ to the level $Q_1$. At the same time, the combustion air pressure P of the air supplied for combustion changes as shown in the figure.

At the time $t_1$, the fuel requirement Q of the vehicle 100 drops from the relatively high level $Q_2$ to the relatively low level $Q_1$, e.g. because the driver of the vehicle 100 releases the accelerator pedal, or because the torque request is reduced, e.g. by a cruise control function.

The fuel requirement Q of the vehicle 100 can decrease from the relatively high level $Q_2$ to the relatively low level $Q_1$, e.g. because the driver of the vehicle 100 releases the accelerator pedal, or because the torque demand is reduced, e.g. by a cruise control function. At the time $t_1$, the driving power requirement thus drops to a relatively low driving power requirement, but instead of at the same time also controlling the combustion air pressure P in such a way that it is reduced to as low a level as possible, with associated fuel saving as a result, the combustion air pressure P is kept at substantially the level $P_1$ right through to the time $t_2$. Only at this time $t_2$ is the combustion air pressure P lowered to a level $P_0$, which from the point of view of fuel consumption is a combustion air pressure that gives rise to a more economic (lower) air/fuel ratio $\lambda$.

This functionality, here called low load function (Low Load Case, LLC), has the purpose of maintaining a high combustion air pressure P, for example, by maintaining a high turbo speed for a certain period of time $t_H$, i.e. between $t_1$ and $t_2$ in FIG. 3, for example 1-3 seconds, even after the torque request has decreased. In this way, the engine response is kept high during this predetermined time $t_H$ in order to ensure that a high torque can be transmitted directly by the internal combustion engine if the conditions for driving the vehicle during said time $t_H$ becomes such that a high transmitted torque is once again needed, which can be the case, for example, if the torque request has dropped as a result of changing to another gear, in which case high driving power is often desirable directly, for example, after changing down gear on an uphill slope.

If the combustion air pressure P is maintained at the pressure $P_1$ during the time period $t_H$, the fuel supply during this time period $t_H$ can be immediately increased again to the level $Q_2$ without any risk of the air/fuel ratio $\lambda$ falling below an inadmissible value, where the entire torque that has been output between the time $t_0$ and $t_1$ in FIG. 3 is thus also substantially directly available when needed up to the time $t_H$.

This functionality is an example of functionality which can be activated in the first mode $M_1$ and which, from a point of view of fuel consumption, has a negative effect on account of increased gas exchange work.

If it is determined in step 201 that the vehicle 100 is being driven according to the first mode $M_1$, the method continues to step 202, where it is determined whether the vehicle is in the process, or soon to be in the process, of being shifted up to a higher gear, where this higher gear is one of the three highest gears of the gearbox (i.e. the three lowest transmission ratios). For example, it can be determined whether the upshift has in fact been completed or will be carried out or completed within a certain time. If the vehicle is being driven with a cruise control function activated, the cruise control function can determine whether a gear change will be carried out within the first period. If the cruise control function is of a look ahead type, the first period can be relatively long, since the look ahead cruise control can assess a suitable time for gear change quite a long time before a gear change is actually carried out using knowledge of the road topology, curvature, properties, etc., ahead of the vehicle. As long as no upshift has been carried out or is about to be carried out, the method returns to step 201. If not, the method continues to step 203 in the event of upshift.

According to one embodiment of the present invention, a transition from step 202 to step 203 takes place only when changing to the highest gear. According to another embodiment, a transition to step 203 takes place only when changing to either of the two highest gears of the vehicle.

According to one embodiment, it is also determined in step 202 whether, after a change of gear, the speed $n_{eng}$ of the internal combustion engine 101 will be below a limit value $n_0$, where the limit value $n_0$ can be any suitable limit value, e.g. an arbitrary speed in the range of 600-1300 rpm, for example. According to one embodiment, the speed $n_0$ is a speed below the speed at which the usual torque plateau of the internal combustion engine occurs, i.e. according to one embodiment the gear change in step 202 is to a low transmission ratio in which the vehicle, at cruising speed, is driven at an internal combustion engine speed below the engine speed at which the torque plateau for gear change is reached. This means that maximum torque is not available at such a gear, for which reason it is also not driveable other than under conditions where the driving power demand is reduced. However, according to other embodiments, for example, according to the present example, the gear change in step 202 is to a transmission ratio in which the vehicle, at cruising speed, can be driven at an internal combustion engine speed above the engine speed at which the torque plateau for the gear is reached.

In step 203, it is then determined whether the torque requested from the internal combustion engine of the vehicle after gear change, or the expected torque request $T_{req}$ after gear change, is below some suitable torque level $T_{lim1}$. The torque level $T_{lim1}$ can, for example, lie at a level corresponding to any suitable level in an interval of at most up to 30-50% of the maximum torque of the internal combustion engine, i.e. the maximum torque transmissible by the engine seen over the speed range of the engine. Thus, for example, the interval can be 0-50% of the maximum torque of the internal combustion engine. The torque level can also be arranged to be determined based on the current train weight of the vehicle. For example, if the train weight of the vehicle is high in relation to the maximum train weight, a higher level can be applied compared with the case when the current train weight of the vehicle differs more from the maximum train weight of the vehicle. Similarly, the torque level $T_{lim1}$ can be arranged to be dependent on a ratio between the maximum transmissible torque or power of the internal combustion engine in relation to the maximum train weight of the vehicle, in order to take account of the fact that vehicles with a similar maximum train weight can be equipped with internal combustion engines of different power.

The expected request for torque from the internal combustion engine of the vehicle after change of gear can be arranged to be determined in different ways. If the vehicle is driven with a look ahead cruise control function, this cruise control function can determine the expected torque request $T_{req}$ after change of gear based on knowledge of the road topology, curvature, properties, etc. If the vehicle is driven with another type of cruise control function activated, the expected torque request $T_{req}$ can, for example, be extrapolated from the current torque request and/or changes of the torque request over time before gear change. If the vehicle is driven without an activated cruise control function, the torque request immediately before gear change can be used as a prediction of the expected torque request after gear change.

If the torque condition in step 203 is not satisfied, the method returns to step 201. If the condition is satisfied, the method continues to step 204, i.e. if the expected torque request after gear change is below the torque level $T_{lim1}$ in step 203. In step 204, the driving of the vehicle is changed from the first mode $M_1$ to a second mode $M_2$. This second mode $M_2$ is a mode in which, compared with the first mode $M_1$, a relatively lower fuel consumption is given priority than driveability, i.e. obtaining lower fuel consumption is prioritized at the cost of a reduction in vehicle performance. In the second mode $M_2$, various measures can be taken to improve (i.e. reduce) the fuel consumption. For example, methods of the type shown in FIG. 3 can be prevented, i.e. driving at a maintained high turbo pressure after a torque requirement has decreased can be prevented, wherein, for example, the combustion air pressure is reduced to the level $P_0$ directly on gear change, which can take place, for example, already at the time $t_1$ in FIG. 3. In the second mode $M_2$, other fuel-saving measures can also be activated, such as, for example, the method described in the parallel Swedish application 1250774-5, with the title "METHOD AND SYSTEM FOR DRIVING A VEHICLE" and with the same applicant, inventor and filing date as the present application. Said application relates to a method in which, when driving the vehicle, an air/fuel ratio in the combustion chamber of the internal combustion engine is controlled such that the air/fuel ratio does not fall below a first limit value, and in which a first margin with respect to the first limit value is maintained.

The method described in said application further includes determining a first measure of a requirement for a margin with respect to the first limit value, and
  if the first measure of said requirement represents a reduced requirement for a margin with respect to the first limit value, reducing the first margin with respect to the first limit value to a second margin smaller than the first margin. According to the above, the driveability is increased by the air/fuel ratio margin, but, by reducing the air/fuel ratio margin when a first condition is satisfied, losses caused by gas exchange work can be reduced, with reduced fuel consumption as a result.

By reducing the air/fuel ratio margin in this way when driving the vehicle 100 according to the second mode $M_2$, it is possible to ensure that the air/fuel ratio margin is only reduced in situations where a sudden increase in the torque request is not expected, wherein driveability is also not affected.

According to the present invention, by only activating the second mode $M_2$ in situations where upshift takes place at the same time as the torque requirement after upshift can be assumed to fall below the limit value $T_{lim1}$, it is possible to ensure that the vehicle response, from a driver perspective, is only reduced in situations where a sudden increase in the torque request is not expected. Thus, it is also less likely for the driver to be affected by poorer driveability, and the vehicle 100 can be driven with higher fuel efficiency without any real negative effect on the driver of the vehicle 100.

The invention also ensures that functions of the type shown in FIG. 3 are not activated unnecessarily. For example, functions of the type shown in FIG. 3 are often activated precisely in conjunction with gear changes for the purpose of maintaining a high engine response so that a high torque can be directly transmitted by the internal combustion engine after engagement of a new gear as required. However, such functions are often activated unnecessarily, and, according to the present invention, such activation, e.g. of functions of the type shown in FIG. 3, is prevented when there is no actual reason for such activation, while at the same time it is also possible to ensure that the present invention is applied when the power demand of the vehicle is relatively low.

The vehicle 100 can then be driven according to the second mode $M_2$ as long as the conditions so permit. For this reason, the method continues from step 204 to step 205, where it is continuously determined whether the mode for driving the vehicle should be changed back to the first mode $M_1$. As long as this is not the case, the vehicle continues to be driven according to the second mode $M_2$. By contrast, if it is determined in step 205 that a change back to the first mode $M_1$ should be carried out, the method continues to step 206, where the mode is changed, after which the method returns to step 201.

The transition from step 205 to step 206 can be controlled, for example, by any suitable criterion. For example, a change to the first mode $M_1$ can take place if a downshift is performed, or if the driver of the vehicle requires a higher torque. According to one example, data concerning the route of the vehicle 100 ahead of the vehicle 100 can be used, for example, a look ahead cruise control function, in order to determine whether the driving power demand of the vehicle 100 will increase in such a way that the need for vehicle response should also increase. The transition from step 205 to step 206 can also be arranged to be controlled by another suitable function/control unit, e.g. if there is a request for a higher torque, or when a request for a higher torque is expected.

According to a further example, it is possible to determine the extent of the torque margin with which the vehicle 100 is driven at the current gear, i.e. how much the drive resistance of the vehicle 100 can increase, e.g. on account of an increased gradient on an upward slope, before a downshift has to be performed. If the vehicle is driven with a large torque margin, a certain increase in the driving power demand will still be able to be met at the current gear, but, if the margin decreases to a level where only a slight or some suitable increase in driving power can take place without the need to change gear, a change to the first mode $M_1$ can take place in order to ensure that power is available when a downshift is then performed.

As will be appreciated, the present invention is not limited to the above-described embodiments of the invention and instead it relates to and comprises all embodiments within the scope of protection of the accompanying independent claims.

For example, in the method shown in FIG. 2, it may be necessary for further criteria to be satisfied. For example, it may be necessary that the speed $v_f$ of the vehicle is greater than a speed $v_0$ for a transfer to driving the vehicle according to the second mode to be carried out. The speed $v_0$ can be any arbitrary speed, preferably a relatively high speed, e.g. in excess of 70 km/h, 75 km/h, 78 km/h, or in excess of any other suitable speed, e.g. in the range 70-90 km/h.

As has been mentioned above, it may also be necessary that the speed $n_{eng}$ of the internal combustion engine has to be below some speed $n_0$ after gear change.

The invention claimed is:

1. A method to reduce fuel consumption of a vehicle, wherein the vehicle comprises an internal combustion engine, and a gearbox that is settable to a plurality of transmission ratios, and the vehicle is configured for being driven in at least a first mode ($M_1$) and a second mode ($M_2$), wherein, in the second mode ($M_2$), a reduced fuel consumption is prioritized to a larger extent at the cost of performance compared with the first mode ($M_1$), the method comprising:
   setting the gearbox from a first transmission ratio to a second transmission ratio that is lower than a first transmission ratio and is one of three lowest settable transmission ratios for the gearbox,
   comparing a torque ($T_{req}$) requested from the internal combustion engine after setting the gearbox to the second transmission ratio with a first torque ($T_{lim1}$), and
   driving the vehicle according to the second mode ($M_2$) if the request for torque ($T_{req}$) from the internal combustion engine is below the first torque ($T_{lim1}$).

2. The method according to claim 1, wherein the vehicle is configured to be selectively driven according to the first mode ($M_1$) and the second mode ($M_2$) at the requested torque ($T_{req}$).

3. The method according to claim 1, wherein
   driving according to the second mode ($M_2$) constitutes driving with a lower combustion air pressure compared to the combustion air pressure in the first mode ($M_1$).

4. The method according to claim 1, further comprising predicting the torque ($T_{req}$) requested from the internal combustion engine after setting the gearbox to the second transmission ratio, wherein the predicting is before the gearbox has been set to the second transmission ratio.

5. The method according to claim 4, further comprising estimating the torque ($T_{req}$) requested after setting the gearbox to the second transmission ratio by using one or more from a group consisting of:
   a cruise control function;
   a look ahead cruise control function;
   a determination of a request for torque before the setting of the gearbox to the second transmission ratio;
   a change over time of a request for torque before the setting of said gearbox to the second transmission ratio.

6. The method according to claim 1, wherein the first torque ($T_{lim1}$) is a torque in a range of 0-50% of the maximum transmissible torque from the internal combustion engine, seen over a speed range of the engine.

7. The method according to claim 1, wherein the size of the first torque ($T_{lim1}$) depends on a current train weight of the vehicle.

8. The method according to claim 1, wherein the size of the first torque ($T_{lim1}$) depends on a ratio between a maximum train weight of the vehicle and a maximum torque transmissible by the internal combustion engine seen over the speed range of the engine, or a maximum transmissible power at a speed, seen over the speed range of the engine, at which maximum power is transmitted.

9. The method according to claim 1, wherein the lower transmission ratio is the lowest settable transmission ratio for the gearbox.

10. The method according to claim 1, further including determining whether a speed ($v_f$) for the vehicle exceeds a first speed ($v_0$), and
    driving the vehicle according to the second mode ($M_2$) if the speed ($v_f$) for the vehicle exceeds the first speed ($v_0$).

11. The method according to claim 10, wherein the first speed is a speed exceeding a suitable speed ($v_0$) in the range of 70-90 km/h.

12. The method according to claim 1, wherein the transmission ratio to which the gearbox is set is a low transmission ratio at which the combustion engine speed is below the engine speed at which a torque plateau for the low transmission ratio is reached.

13. The method according to claim 1, further comprising determining whether a speed ($n_{eng}$) of the internal combustion engine after setting to the second transmission ratio is below a first speed ($n_0$), and
    driving the vehicle according to the second mode ($M_2$) if the speed ($n_{eng}$) of the internal combustion engine is below the first speed ($n_0$).

14. The method according to claim 13, wherein the first speed ($n_0$) of the internal combustion engine is in the range of 600-1300 rpm.

15. The method according to claim 1, wherein, in the first mode ($M_1$), an air/fuel ratio for combustion in the internal combustion engine is controlled such that the air/fuel ratio does not fall below a first limit value, and wherein the combustion is also controlled such that a first margin with respect to the first limit value is maintained, and wherein, in the second mode ($M_2$), the first margin with respect to the first limit value is reduced to a second margin being smaller than the first margin.

16. The method according to claim 15, wherein the first limit value is essentially a minimum air/fuel ratio that is needed from the point of view of combustion.

17. The method according to claim 1, wherein, at least in the first mode ($M_1$), the combustion air pressure is maintained at a pressure that is higher than what is necessary from the point of view of combustion.

18. The method according to claim 1, wherein, in the first mode ($M_1$), maintaining a combustion air pressure at a higher value during a first period ($t_H$) after a reduction of the requested torque from the internal combustion engine compared with maintained combustion air pressure after a reduction of the requested torque from the internal combustion engine in the second mode ($M_2$).

19. The method according to claim 1, further comprising determining whether conditions for driving the vehicle according to the second mode ($M_2$) are no longer satisfied, and changing the mode for driving the vehicle to the first mode ($M_1$) in response to conditions that do not satisfy conditions for driving the vehicle according to the second mode ($M_2$).

20. A computer program product comprising a program code stored in a non-transitory computer readable medium which causes a computer to perform the method according to claim 1.

21. A system configured to reduce fuel consumption of a vehicle, wherein the vehicle comprises an internal combustion engine, and a gear box that is settable to a plurality of transmission ratios, and the vehicle is configured for being driven in at least a first mode ($M_1$) and a second mode ($M_2$), wherein, in the second mode ($M_2$), a reduced fuel consumption is prioritized to a larger extent at the cost of performance compared with the first mode ($M_1$), the system comprising:

a control unit that:

a) sets the gearbox from a first transmission ratio to a second transmission ratio that is lower than the first transmission ratio, and is one of the three lowest settable transmission ratios for the gearbox, b) compares a torque ($T_{req}$) requested from the internal combustion engine after setting the gearbox to the second transmission ratio with a first torque ($T_{lim1}$), and c) drives the vehicle according to the second mode ($M_2$) if the request for torque ($T_{req}$) from the internal combustion engine is below the first torque ($T_{lim1}$).

22. The system according to claim 21, wherein the internal combustion engine is a diesel engine.

23. A vehicle, characterized in that it comprises a system according to claim 21.

* * * * *